United States Patent
Martins et al.

(10) Patent No.: US 9,735,969 B2
(45) Date of Patent: Aug. 15, 2017

(54) ELECTRONIC SIGNATURE METHOD WITH EPHEMERAL SIGNATURE

(71) Applicant: Morpho, Issy-les-Moulineaux (FR)

(72) Inventors: Alexandre Martins, Issy-les-Moulineaux (FR); Hervé Chabanne, Issy-les-Moulineaux (FR); Julien Bringer, Issy-les-Moulineaux (FR); Olivier Cipière, Issy-les-Moulineaux (FR); Rodolphe Hugel, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 95 days.

(21) Appl. No.: 14/434,716

(22) PCT Filed: Oct. 11, 2013

(86) PCT No.: PCT/EP2013/071326
§ 371 (c)(1),
(2) Date: Apr. 9, 2015

(87) PCT Pub. No.: WO2014/057107
PCT Pub. Date: Apr. 17, 2014

(65) Prior Publication Data
US 2015/0270977 A1    Sep. 24, 2015

(30) Foreign Application Priority Data
Oct. 11, 2012 (FR) .................. 12 59722

(51) Int. Cl.
*H04L 9/08*     (2006.01)
*H04L 9/32*     (2006.01)
(Continued)

(52) U.S. Cl.
CPC .......... *H04L 9/3268* (2013.01); *H04L 9/0866* (2013.01); *H04L 9/30* (2013.01);
(Continued)

(58) Field of Classification Search
CPC ... H04L 9/0866; H04L 9/007; H04L 2209/72; H04L 9/3231
See application file for complete search history.

(56) References Cited

U.S. PATENT DOCUMENTS

| | | | |
|---|---|---|---|
| 8,589,696 B2 * | 11/2013 | Atherton | G06F 21/32 713/186 |
| 2003/0208684 A1 * | 11/2003 | Camacho | G06F 21/32 713/186 |

(Continued)

FOREIGN PATENT DOCUMENTS

| | | |
|---|---|---|
| FR | 2 925 732 | 6/2009 |
| WO | WO-02/23796 | 3/2002 |
| WO | WO-2010/132928 | 11/2010 |

*Primary Examiner* — Ellen Tran
(74) *Attorney, Agent, or Firm* — Blakely Sokoloff Taylor & Zafman LLP (57) ABSTRACT

The invention concerns a method for generating an electronic signature key and an associated public key certificate, implemented by a client unit and a server unit, the method comprising a step during which the client unit and/or the server unit generate(s) a signature key comprising a private key and a public key, and a public key certificate comprising said public key, the method being characterized in that the client unit acquires an item of biometric data of an individual, and in that the signature key and/or the public key certificate are generated from at least a portion of said biometric data, and in that the portion of biometric metric data from which the signature key and/or the public key certificate have been generated is ephemeral and is not memorized after the signature key and the public key certificate have been generated. The invention also concerns a method for transferring a message and a system designed to implement the method for generating a signature key.

17 Claims, 3 Drawing Sheets (51) Int. Cl.
*H04L 9/30* (2006.01)
*H04L 9/00* (2006.01)

(52) U.S. Cl.
CPC .......... *H04L 9/3249* (2013.01); *H04L 9/3252* (2013.01); *H04L 9/007* (2013.01); *H04L 2209/24* (2013.01); *H04L 2209/64* (2013.01); *H04L 2209/72* (2013.01)

(56) References Cited

U.S. PATENT DOCUMENTS

| | | | |
|---|---|---|---|
| 2004/0059924 A1* | 3/2004 | Soto | G06F 21/32 713/186 |
| 2010/0030696 A1* | 2/2010 | Naccache | G06F 21/305 705/71 |

* cited by examiner

ELECTRONIC SIGNATURE METHOD WITH EPHEMERAL SIGNATURE

The present patent application is a national phase application of International Application No. PCT/EP2013/071326, filed Oct. 11, 2013.

FIELD OF THE INVENTION

The field of the invention is that of the electronic signing of documents, messages or transactions.

PRIOR ART

Currently the biometrics of individuals are used for recognition or identification purposes, by carrying out the digital acquisition of the biometrics of an individual to obtain items of digital biometric data specific to the individual.

In the document FR 2 925 732, use is made of a property of the biometric data of individuals, according to which two successive acquisitions of the same biometric feature from one and the same individual generate different data items. This property is exploited to generate secret cryptographic keys from biometric data items, these keys having a high level of entropy. Such a signing key can be obtained from a hashed biometric data item, for example.

This type of signing key can be used to electronically sign a set of data to be transferred, for example an electronic document or a message. Electronic signing makes it possible to guarantee that the transferred data have not been altered and do indeed come from the requisite person.

However, this type of key does not allow the identity of the signatory to be retrieved; it is necessary to obtain other information than the signature of the message, since the signing alone does not make it possible to retrieve the biometric data item used for signing the message.

One drawback of this type of use is that a signing key generated from a biometric data item of an individual, or the biometric data item itself, is stored, with a view to later use, on a storage medium such as a chip card. A user who wishes to sign a message must use a chip card reader to use the signing key. However, the need to possess such a card can be restrictive, and its possible uses can be limited.

In other cases, a signing key generated from a biometric data item can also be stored on a storage medium of fixed IP server type, but the same problem of limitation of the possible uses of the signing key arises.

The document WO 2002/23796 describes the signing of a document comprising biometric authentication, this authentication determining the generation of single-use signature keys of a hash of a document.

These signing keys having no link with the sender of the message, they therefore make it possible to ensure the integrity of the message after its sender has been recognized, but not to retrieve the individual who has signed it.

OVERVIEW OF THE INVENTION

One aim of the invention is to propose a data processing method making it possible to eliminate the need of the storage of a biometric data item in view of a later use of said data item.

In this respect, the subject of the invention is a method for generating an electronic signing key and an associated public key certificate, implemented by a client unit and a server unit, the method comprising a step wherein the client unit and/or the server unit generate(s) a signing key comprising a private key and a public key, and a public key certificate comprising said public key,
the method being characterized in that the client unit acquires a biometric data item about an individual, in that the signing key and/or the public key certificate are generated from at least a part of said biometric data item, and in that the part of the biometric data item from which the signing key and/or the public key certificate have been generated is ephemeral and is not stored in the memory after generation of the signing key and the public key certificate.

Advantageously, but optionally, the invention further comprises at least one of the following features:
the generation of the signing key and the certificate is carried out by implementing a signing key generation algorithm combined with a signature scheme from among the following group: RSA, DSA, and ECDSA.
In the method:
the client unit transfers the biometric data item to the server unit,
the server unit and/or the client unit generate(s) at least one of the private key and the public key, and
the server unit generates the public key certificate and transfers it to the client unit.
In the method:
the server unit generates the public key from the biometric data item b and from a private server key,
the client unit randomly generates two private prime numbers and forms a public RSA integer from said prime numbers,
the client unit transfers the RSA integer to the server unit, and
from the RSA integer and the public key, the client unit generates a private key,
the signing key obtained being the (private key, public key) pair and the associated public key certificate being the (public key, RSA integer) pair.
the client unit further acquires items of geolocation data and transfers them to the server unit with the biometric data item.
The method further comprises, prior to the generation of the signing key and the certificate, the verification of the identity of the individual by the server unit, on the basis of at least a part of its biometric data item and, where applicable, the associated items of geolocation data.
The method is implemented in a system further comprising a database comprising a plurality of reference biometric data from individuals, the verification of the identity of the individual comprising the comparison of the biometric data item of the individual to one or more reference biometric data items to identify or authenticate the individual respectively.
The biometric data comprises at least two parts, and the method being such that:
the step of generation of the signing key and/or the public key certificate is performed on the basis of a first part of the biometric data item, and
a second part of the biometric data item is stored on a storage medium.
the biometric data item is a biometric image or a biometric template acquired from at least one of the following biometrics: fingerprint, voiceprint, face shape, and iris.
The invention also proposes a method for transferring a message between a client unit and a destination unit, comprising the implementation of the method for generating an electronic signing key and an associated certificate by a server unit and the client unit to generate an electronic signing key comprising a private key and a public key, and an associated public key certificate, the method further comprising the steps wherein:
the client unit signs at least one message to be transferred with the private key and transfers said signed message and the certificate to the destination unit,
the destination unit communicates the signature of the message to the server unit, and
the server unit decodes said signature to obtain at least a part of a biometric data item having been used to generate the signature.

Advantageously, but optionally, the method for transferring a message according to the invention can further comprise at least one of the following features:
the signing key and the certificate are erased after transfer of one or a plurality of messages, or after a predetermined time period.
The method further comprises a step wherein the server unit sends the biometric data item back to the destination unit so that the latter verifies a match between the owner of said data item and the individual from which the transferred message has originated.
The method further comprises the steps wherein:
the destination unit acquires a new biometric data item about the individual and transfers said data item to the server unit, and
the server unit compares the new biometric data item to the data item of the individual to determine a match between the owner of said data item and the individual from which the transferred message has originated.
In the method one or more client units send a plurality of signed messages and corresponding certificates to the server unit, the signature and the certificate of each message being obtained from separate biometric data items, the method further comprises the verification by the server unit, on the basis of the certificates, that the biometric data items belong to the same individual.

Finally, the invention proposes a system for generating a signing key and an associated public key, adapted to implement the method for generating a signing key and an associated public key according to the invention, the system comprising a client unit and a server unit adapted to generate, from at least a part of a biometric data item, a signing key comprising a public key and a private key, and/or a public key certificate,
the client unit being further adapted to acquire the item of biometric data about an individual, and to sign at least one message on the basis of the private key and the public key certificate, and
the client unit and the server unit being adapted to temporarily store the part of a biometric data item in the memory until the generation of the signing key and the public key certificate, and to remove said part of a biometric data item after said generation.

Advantageously, but optionally, the system according to the invention further exhibits at least one of the following features:
the client unit is further adapted to acquire geolocation data about the individual, and to transfer said data to the server unit with the biometric data item,
the client unit is a smartphone or a chip card.

DESCRIPTION OF THE FIGURES

Other features, goals and advantages of the present invention will become apparent on reading the following detailed description, with reference to the appended figures, given by way of non-limiting example and wherein.

DETAILED DESCRIPTION OF AT LEAST ONE MODE OF IMPLEMENTATION OF THE INVENTION

System for Generating an Electronic Signature

Figure 1:
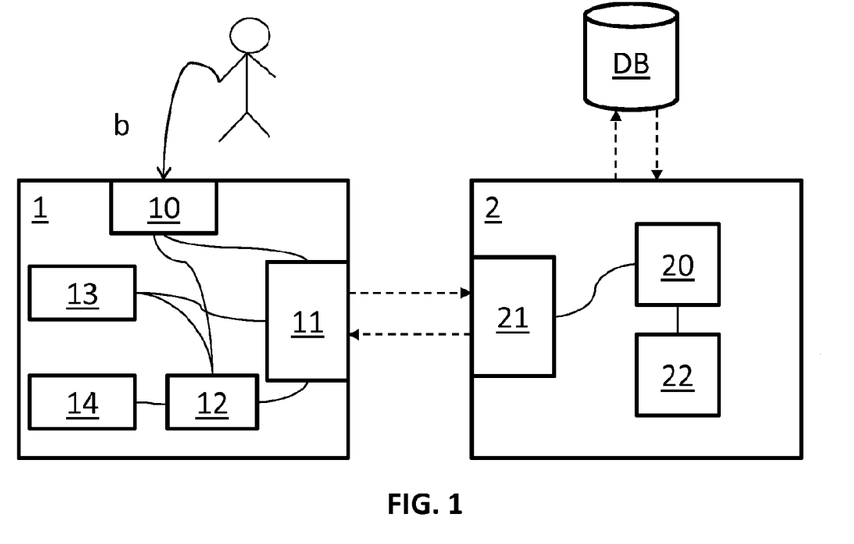
FIG. 1 represents the components of an electronic signing system.

A method for the electronic signing of messages to be transferred is jointly implemented by a client unit 1 and a server unit 2, these two units being schematically represented in FIG. 1.

The client unit 1 comprises as a minimum a biometric data sensor 10 and means 11 for transmitting data, preferably wireless.

This sensor can be a digital camera or a video camera, or else a fingerprint sensor, to acquire a photograph of the face of an individual, his or her iris, or a fingerprint respectively.

The client unit 1 can be a secure element such as a secure telephone or a chip card. It comprises a computing unit 12 which can be a processor of a fixed IP server or the chip of a chip card. Advantageously, the client unit is a smartphone, i.e. a mobile phone equipped with additional functionality allowing the connection to, and navigation of, an Internet network, and its computing unit 12 is integrated into the SIM card of the smartphone or into its internal processor.

In the case where the client unit 1 is a smartphone, the sensor 10 is advantageously a digital camera integrated into said smartphone, or the microphone of said smartphone, and the client unit is advantageously completed with a geopositioning device 13, adapted to acquire information about the geolocation of the smartphone.

The client unit 1 also comprises a memory 14.

The server unit 2 comprises a computing unit 20, means 21 for transmitting data, preferably wireless, and a memory 22. The server unit is preferably a fixed IP server.

Electronic Signing Method

With reference to FIG. 1, the main steps of the method according to the invention are represented.

Figure 2:
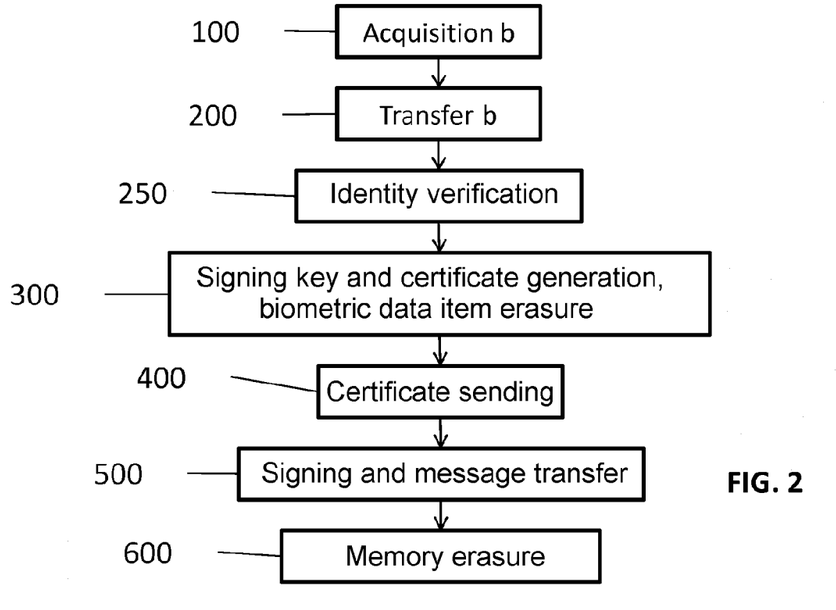
FIG. 2 represents the main steps of an electronic signing method.

In a step 100, the client unit 1 uses the sensor 10 to acquire a biometric data item b about an individual I seeking to sign and transfer a message. This data b can for example be a fingerprint, a photograph of the face of the individual, a voiceprint, or the capture of the individual's iris.

This data item b is acquired directly from the individual, and does not come from a data item previously stored on the memory means of the client unit.

The biometric data item b can be acquired in several separate parts of data $b_1, b_2 \ldots b_n$, or be split into as many parts after acquisition.

In this same step, the client unit 1 can also acquire geolocation data to identify its location, and therefore that of the individual I, at the moment of acquisition of the biometric data item. The fact of acquiring geolocation data in association with the biometric data item makes it possible to provide redundancy of information about the identity of the individual and to limit the risks of such an identity being usurped.

The client unit 1 can also acquire an item of third-party data relating to the identity of the individual, such as for example an ID card number, a social security number etc.

In a step 200, the client unit 1 transfers the biometric data item, or a biometric template, i.e. a data item containing information that is characteristic of the biometric data item and that has been previously extracted by the client unit 1, to the server unit 2. Where applicable, the client unit 1 also transfers the additional data acquired in the preceding step, i.e. the geolocation data and the data item relating to the identity of the individual.

Optionally, the method further includes a step 250, consisting in verifying the identity of the individual.

To do this, the server unit 2 comprises or is connected to a database DB comprising a plurality of reference identity data $Id_{ref}$ of identified individuals. These data can be identity data, in the case where the client unit 1 has transferred an individual's identity data item Id to the server 2. Alternatively, these data can be biometric data items of the same type (for example fingerprints) as the acquired biometric data item about the individual I.

These data items can also be pairs comprising an identity data item and a biometric data item.

The verification takes place by comparing the biometric data item b and/or the identity data item Id of the individual to the reference data, either by authentication (comparison of the data item of the individual to a reference data item from the base presumed to correspond to the same individual), or by identification (comparison of the data item of the individual to a plurality of reference data from the base, to detect a match between an individual from the base and the individual I to be identified.)

In the case where the biometric data item b is composed of several parts, for example two parts $b_1$, $b_2$, a part $b_1$ is advantageously used to generate the signing key and/or the associated public key certificate, while the other part $b_2$ is used to verify the identity of the individual.

In this case, the part $b_2$ is compared to one or more parts of corresponding biometric data items previously stored in the database.

Alternatively, the part $b_2$ can be stored on a storage medium with the aim of using it later, for example for completing the part $b_1$ in the case where this part $b_1$ does not suffice to identify the individual who has the message. In this case, the part $b_2$ makes it possible to complete the first part $b_1$ to identify the individual.

The storage medium of the part $b_2$ can be a database $DB_2$ (not represented in the figures) associated with the server unit, or the memory means of the server unit or of the client unit, or a message to be signed etc.

In a step 300, and where applicable if the individual has been authenticated or identified, the client unit 1 and/or the server unit 2 generate a signing key comprising a private key and a public key, as well as a public key certificate associated with this public key. Preferably, at least one of the public key associated with the signing key and the public key certificate are generated from all or part of the biometric data item b. More specifically, the client unit 1 and/or the server unit 2 generate the signing key comprising the private key and the public key, and the server unit 2 generates a public key certificate comprising said public key. By being joined by a unit to a signed message, the public key certificate makes it possible to guarantee the authenticity of the key used: once the validity of the certificate has been checked, the public key that it contains makes it possible to verify the validity of the signature of the transferred message.

Various exemplary implementations of this step 300 are described below with reference to FIGS. 3 and 4.

To allow the implementation of this step 300 of generation of the signing key and the associated public key certificate, the acquired biometric data item b about the individual I in the first step 100 of the method is temporarily stored in the memory by the respective memory means 11, 12 of the client unit 1 and the server unit 2, while these generate the signing key and/or the public key certificate.

However, at the end of the step 300, the biometric data item b is erased from the memory or memories 11, 12 of the client unit 1 and the server unit 2. The data item b is thus ephemeral: it is only used for the generation of a signing key and the associated public key certificate, and is not preserved after this operation.

Following the step 300 of generation of a signing key and a public key certificate, in a step 400 the server unit 2 sends the public key certificate to the client unit 1.

In addition, if the server unit 2 has generated the private key, the latter is sent in this step, via a secure channel, to the client unit 1. If on the other hand the client unit 1 has generated said private key, the latter remains in the possession of the client unit.

At the end of this step, the client unit 2 therefore has access to the private key and the public key certificate that contains the public key.

In a step 500 it can therefore sign a message using its private key, and transfer this message to a recipient by joining the public key certificate thereto.

The signing key and the associated public key certificate can also be ephemeral, i.e. not be preserved after having been used to sign one, or where applicable a given number of messages, or else they can be erased after a predetermined passage of time. The method can therefore comprise a step 600 of erasure of the signing key and the certificate from the memories of the client unit and the server unit.

In the case of an erasure of the signing key and the certificate, the elements that have been used to generate them are also removed at the end of the step 300.

Advantageously, the biometric data item b, the signing key and the corresponding certificate are used to sign only a single message, and are renewed with each new message to be transferred. Thus, not only the signature and the certificate used exhibit a high level of confidentiality due to the fact that they are derived from a biometric data item, but additionally the fact that they are renewed with each new message to be transferred makes it possible to not store them and to avoid any risk of usurping.

In the case where the signing key and the certificate are generated from only a part $b_1$ of a biometric data item, the signature has a higher level of confidentiality because it is not possible to retrieve the original data item b from only a part thereof.

Generation of a Signing Key and an Associated Public Key Certificate.

Figure 3A:
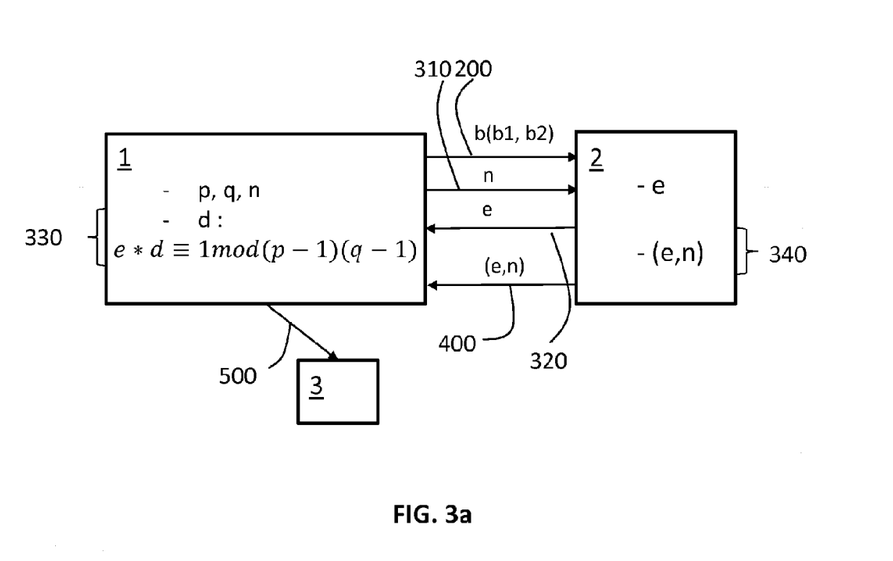
FIG. 3a represents the implementation of an electronic signing method associated with the RSA signature algorithm.
Figure 3B:
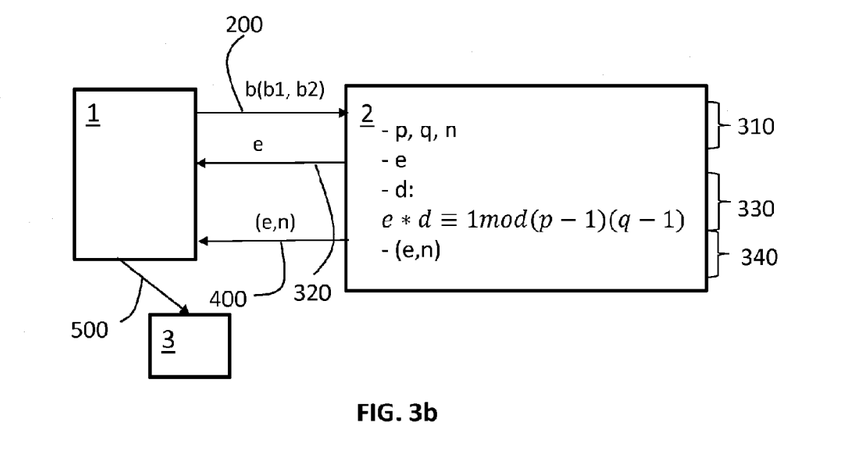
FIG. 3b represents a variant of the implementation illustrated in FIG. 3a, wherein the computing steps are implemented by the server unit.
Figure 4A:
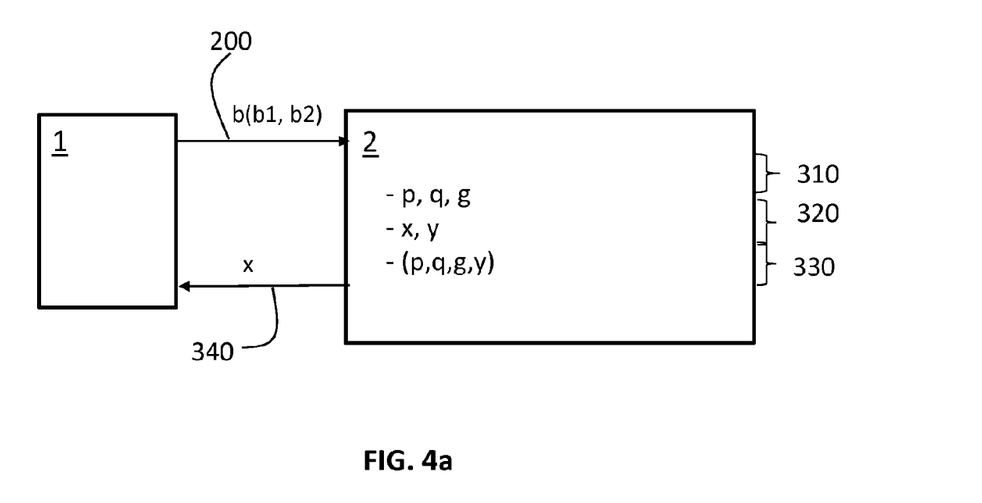
FIG. 4a represents the implementation of an alternative embodiment of an electronic signing method, associated with the DSA signature algorithm.
Figure 4B:
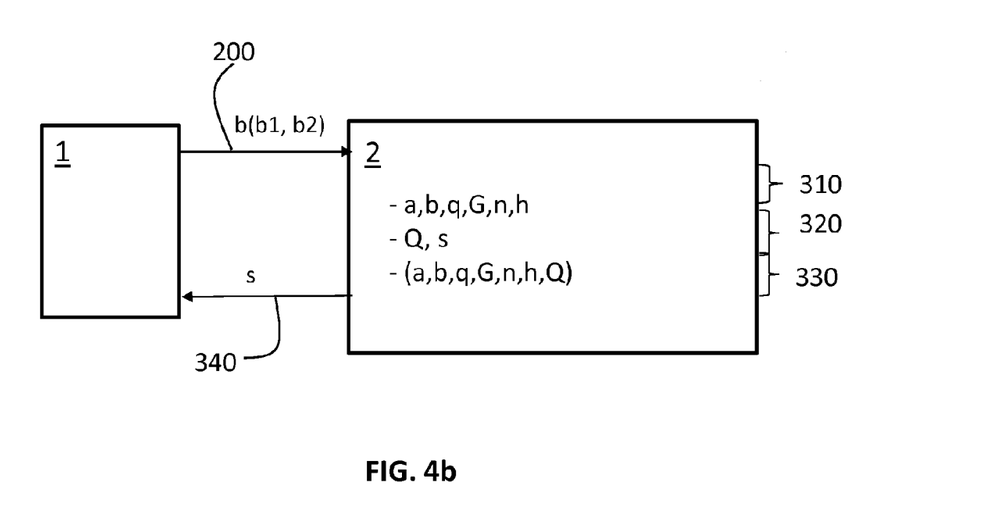
FIG. 4b represents the implementation of an alternative embodiment of an electronic signing method, associated with the ECDSA signature algorithm.

With reference to FIGS. 3 and 4, embodiments of the step 300 of generation of a signing key and a public key certificate from the biometric data item will now be described, after the client unit has acquired and transferred to the server a biometric data item and where applicable identification data items and geolocation data items.

This step is advantageously carried out using known cryptography techniques such as RSA, DSA or ECDSA in particular. It can be implemented by the server unit alone, or jointly by the server unit and the client unit if the latter possesses computing means. In the following, the computing steps implemented by one or the other of the client unit and the server unit are performed by their computing unit 12, 20 respectively. For example, in the case where the client unit is a chip card, the computing steps are implemented by the chip card. If the client unit is a smartphone, the computing steps can be implemented by the SIM card of the smartphone, or by the processor of the latter.

As described before, in the first case, the server unit generates the private key, the public key, and the certificate, then sends the private key to the client unit via a secure channel, and in the second case, it is the client unit that generates its private key.

FIG. 3a represents a mode of implementation using the RSA technique, wherein the client unit and the server unit contribute jointly to the generation of the private keys, public keys and the certificate. The DSA and ECDSA methods are also applicable.

In a step 310, the client unit randomly generates two prime numbers p and q to form a said RSA integer n=pq. n is public, and is sent by the client unit to the server unit.

In a step 320, the server unit generates a public key e from the biometric data item b, and where applicable from other elements, comprising for example an item of individual identity data Id, its geopositioning coordinates, a timestamp, a counter, or a randomly generated data item, a public key $e = E_K(b)$, where $E_K$ is a symmetrical encryption algorithm, the inversion of which is considered as "difficult" (the inversion is impossible to carry out with current computing means without knowing the key K.) To do this the server unit has access to a private server key K. The server unit sends the public key e to the client unit.

In a step 330, the client unit computes its private key d such that $d*e \equiv 1 \mod(p-1)(q-1)$. The signing key obtained is the (private key, public key) pair such that the private key is d and the public key is e. If such a d does not exist, the data items that were used to obtain the public key e are adapted or modified with the aim of repeating this step and obtaining the private key d. This repetition can be implemented at the end of the step 320 of generation of the public key e or at the end of step 330. In this case, the client unit, having detected the impossibility of obtaining a private key d, sends an error message to the server unit.

In a step 340, the client unit then generates a certificate containing the pair (e, n), which is transferred in the step 400 to the server unit. The server unit then signs the certificate on the basis of a said certificate signing key of the server and sends the certificate thus certified/validated back to the client unit.

As previously indicated, at the end of the step 300 of generation of the signing key and the associated public key certificate, a step 350 of erasure of the biometric data item b as well as data that was used to generate the signing key and the certificate is implemented. In this case, the client unit and/or the server unit erase the additional data that was used to generate the public key e.

In step 500, the client unit signs the message from the pair (d,n) and sends the signed message with the certificate (e,n) to a destination unit 3. This signature can be verified by the destination unit 3 using the public key e contained in the certificate without obtaining any information on the biometric data item b used.

When this signed message or the signature is simultaneously or subsequently send to the server unit (by the client unit or by the recipient), the signature can be decoded by the server unit to obtain the biometric data item b, on the basis of the public key e and the corresponding private encryption key K.

When the biometric data item b comprises two parts $b_1$ and $b_2$, the part $b_1$ of which has been used to generate the signing key and the associated public key certificate, the part $b_2$ has been stored on an additional medium, either in a database $DB_2$, or in the message etc. Where applicable, the part $b_2$ can have been encrypted by the server unit using a dedicated secret key.

The server unit then decodes the signature to obtain the part $b_1$, and recovers the part $b_2$ to obtain the complete biometric data item b, and can make use of this data item to link the signature to the individual.

To do this, the data item b makes it possible to identify the individual in the same way as in the step 250 of verification of its identity, by comparison to a central database DB.

Alternatively, to link the signature to the individual, the recipient of the message can simultaneously send the signature and a new acquired biometric capture b' about the individual from whom the message to the server unit originated. The latter can decode the signature to obtain the biometric data item b, and compare the data item b to the data item b' to detect a match.

According to another alternative, the recipient of the message can send the signature to the server unit, which decodes it to obtain the biometric data item b. The server unit can then send the data item b back to the initial recipient of the message, the latter being then able to determine if this data item b matches the individual having signed the message. For example, if the data item b is a face photograph, the recipient can compare the received photo to another photo stored on a medium or to the face of a person from whom the signed message originated.

These modes of implementation make it possible to avoid relying on a central database DB.

If the server unit receives a plurality of signatures with a certificate $(e_i, n_i)$ in each signature, the server unit can decrypt each of the public keys $e_i$ from the corresponding encryption function $E_{Ki}$ to obtain a biometric data item $b_i$. The comparison of the different biometric data items $b_i$ makes it possible to determine whether or not the certificates come from the same individual.

This mode of implementation is particularly secure due to the fact that the server unit has no access to the private data p and q held by the client unit.

According to an alternative mode of implementation represented in FIG. 3b, the step of generation of the signing key 300 is implemented only at the server unit.

Thus, in the step 310, it is the server unit that randomly generates the two prime numbers p and q to form the public RSA integer n=pq. The server unit transfers this integer to the client unit via an insecure channel (since n is public).

The step 320 is as previously, and the step 330 of generation of the private key d is implemented by the server unit, which then transfers this private key to the client unit via a secure channel. The step 340 of generation of the public key certificate associated with the signing key is implemented by the server unit, which transfers said certificate to the client unit.

Thus, all the computing steps are implemented by the server unit.

FIG. 4a represents an alternative embodiment of the step 300 of generation of the signing keys, wherein the step 300 is performed solely by the server unit, by means of the DSA method.

In this step, the server unit generates in a step 310 the parameters p, q which are prime numbers, such that p−1=qz with z an integer, and g and h such that 1<h<p−1 and g=h$^z$ mod p is greater than 1. g is an element of order q modulo p computed on the basis of an encryption of the biometric data item b (and where applicable additional data as indicated above), and where the encryption algorithm is chosen in such a way as to obtain the elements of the group of the integers modulo p in the case of DSA.

In a step 320, the server unit randomly generates a private key x for the client unit, such that 0<x<q, and it computes a public key y such that y=g$^x$ mod p.

In a step 330, the server unit creates a certificate including the parameters p, q and g and the public part y of the key.

In a step 340, the server unit sends the private key x to the client unit over a secure channel. Alternatively, the private key x and the public key y are generated by the client unit.

The following steps of the method are the same as previously.

FIG. 4b illustrates a variant employing the ECDSA method. In this variant, the server unit generates in a step 310 a set of parameters a,b,q,G,n and h, such that:

the elements a and b are two elements of a finite field of cardinal q, defining an elliptic curve y$^2$=x$^3$+ax+b.

G is an element of the elliptic curve of order n with n a prime, computed on the basis of an encryption of the biometric data item b, where the encryption algorithm is chosen in such a way as to obtain points on the elliptic curve, h is the cofactor of the curve.

In a step 320, the server unit chooses an integer s between 1 and n−1 and computes Q=sG from the elliptic curve. Q is the public key, and s is the private key.

In the step 330, the server unit creates a certificate including the parameters q,a,b,G,n and h, as well as the public key Q, and in a step 340 sends the private key s to the client unit.

The following steps of the method are the same as previously.

The fact of being able to implement the step of generation of the signing key solely on the server unit makes it possible to use a client unit with limited computing means.

Finally, the signature used does not give access to the biometric data item used and makes it possible to preserve the confidentiality of the signatory of the message.

The proposed method also has the advantage of being able to be implemented entirely following the usual standards in the field of public key infrastructures (known by the acronym PKI.)

The invention claimed is:

1. A method for generating an electronic signing key and an associated public key certificate, implemented by a client unit (1) and a server unit (2), the method comprising a step wherein the client unit and/or the server unit generate(s) a signing key comprising a private key and a public key, and a public key certificate comprising said public key, the method being characterized in that the client unit (1) acquires a biometric data item about an individual, in that the signing key and/or the public key certificate are generated from at least a part of said biometric data item (b, b$_1$) so that they can be decoded to obtain said part of the biometric data item, and in that the part of the biometric data item (b, b$_1$) from which the signing key and/or the public key certificate have been generated is ephemeral and is not stored in the memory after generation of the signing key and the public key certificate.

2. The method according to claim 1, wherein the generation of the signing key and the certificate is carried out by implementing a signing key generation algorithm associated with a signature scheme from among the following group: RSA, DSA, ECDA.

3. The method according to claim 1, wherein:

the client unit (1) transfers the biometric data item (b) to the server unit (2), the server unit and/or the client unit generate(s) at least one of the private key and the public key, and the server unit generates the public key certificate and transfers it to the client unit.

4. The method according to claim 3, wherein the server unit generates the public key (e) from the biometric data item b and from a private server key (K), the client unit randomly generates two private prime numbers (p, q) and forms a public RSA integer (n) from said prime numbers, the client unit transfers the RSA integer (n) to the server unit, and from the RSA integer (n) and the public key (e), the client unit generates a private key (d), the signing key obtained being the (private key, public key) pair (d,e) and the associated public key certificate being the (public key, RSA integer) pair (e,n).

5. The method according to claim 1, wherein the client unit further acquires items of geolocation data and transfers them to the server unit with the biometric data item.

6. The method according to claim 1, further comprising, prior to the generation of the signing key and the certificate, the verification of the identity of the individual by the server unit, on the basis of at least a part of its biometric data item (b, b$_2$) and where applicable the associated items of geolocation data.

7. The method according to claim 6, implemented in a system further comprising a database (DB) comprising a plurality of reference biometric data from individuals (b$_{ref}$), the verification of the identity of the individual comprising the comparison of the biometric data item of the individual to one or more reference biometric data items to identify or authenticate the individual respectively.

8. The method according to claim 1, wherein the biometric data item (b) comprises at least two parts (b1, b2), and wherein:

the step of generation of the signing key and/or the public key certificate is performed on the basis of a first part (b1) of the biometric data item (b), and a second part (b2) of the biometric data item (b) is stored on a storage medium.

9. The method according to claim 1, wherein the biometric data item is a biometric image or a biometric template acquired from at least one of the following biometrics: fingerprint, voiceprint, face shape, and iris.

10. A method for transferring a message between a client-unit and a destination unit (3), comprising the implementation of the method according to claim 1 by a server unit (2) and the client unit (1) to generate an electronic signing key comprising a private key and a public key and an associated public key certificate, the method further comprising the steps wherein:

the client unit (1) signs at least one message to be transferred with the private key and transfers said signed message and the certificate to the destination unit (3), the destination unit (3) communicates the signature of the message to the server unit, and the server unit (2) decodes said signature to obtain at least a part of a biometric data item (b) having been used to generate the signature.

11. The method for transferring a message according to claim 10, wherein the signing key and the certificate are erased after transfer of one or a plurality of messages, or after a predetermined time period.

12. The method for transferring a message according to claim 10, further comprising a step wherein the server unit (2) sends the biometric data item (b) back to the destination unit (3) so that the latter verifies a match between the owner of said data item (b) and the individual from which the transferred message has originated.

13. The method for transferring a message according to claim 11, further comprising the steps wherein:

the destination unit (3) acquires a new biometric data item (b') about the individual and transfers said data item to the server unit (2), and the server unit (2) compares the new biometric data item (b') with the data item (b) of the individual to determine a match between the owner of said data item and the individual from which the transferred message has originated.

14. The method for transferring a message according to claim 11, wherein one or more client unit(s) send a plurality of signed messages and corresponding certificates to the server unit, the signature and the certificate of each message being obtained from separate biometric data items, the method further comprising the verification by the server unit, on the basis of the certificates, that the biometric data items belong to the same individual.

15. A system for generating a signing key and an associated public key certificate, the system comprising a client unit (1) and a server unit (2) adapted to generate, from at least a part of a biometric data item (b, $b_1$), a signing key comprising a public key and a private key, and/or a public key certificate, wherein the client unit and/or the server unit generate(s) the signing key, wherein the client unit (1) acquires the biometric data item about an individual, the signing key and/or the public key certificate are generated from at least a part of said biometric data item (b, $b_1$) so that they can be decoded to obtain said part of the biometric data item, wherein the part of the biometric data item (b, $b_1$) from which the signing key and/or the public key certificate have been generated is ephemeral and is not stored in the memory after generation of the signing key and the public key certificate, the client unit (1) being further adapted to sign at least one message on the basis of the private key and the public key certificate, and the client unit (1) and the server unit (2) being adapted to temporarily store the part of the biometric data item (b, $b_1$) in the memory until the generation of the signing key and the public key certificate, and to remove said part of a biometric data item after said generation.

16. The system according to claim 15, wherein the client unit (1) is further adapted to acquire geolocation data about the individual, and to transfer said data to the server unit (2) with the biometric data item.

17. The system according to claim 15, wherein the client unit (1) is a smartphone or a chip card.

* * * * *